US011632531B1

(12) United States Patent
Bryan et al.

(10) Patent No.: US 11,632,531 B1
(45) Date of Patent: Apr. 18, 2023

(54) SYNCHRONIZATION AND PRESENTATION OF MULTIPLE 3D CONTENT STREAMS

(71) Applicant: Amazon Technologies, Inc., Seattle, WA (US)

(72) Inventors: Tony Norman Bryan, Lake Forest Park, WA (US); Paul Martin, Seattle, WA (US); Samuel Leiber, Fairfax, VA (US); Brent Allen Colson, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 19 days.

(21) Appl. No.: 17/306,394

(22) Filed: May 3, 2021

(51) Int. Cl.
| | |
|---|---|
| *H04N 13/156* | (2018.01) |
| *H04N 21/43* | (2011.01) |
| *H04N 13/167* | (2018.01) |
| *H04N 5/14* | (2006.01) |
| *H04N 13/117* | (2018.01) |
| *H04N 21/2187* | (2011.01) |

(52) U.S. Cl.
CPC .......... *H04N 13/156* (2018.05); *H04N 5/147* (2013.01); *H04N 13/117* (2018.05); *H04N 13/167* (2018.05); *H04N 21/2187* (2013.01); *H04N 21/4307* (2013.01)

(58) Field of Classification Search
CPC .... H04N 13/156; H04N 5/147; H04N 13/117; H04N 13/167; H04N 21/2187; H04N 21/4307

USPC .......................................................... 348/43
See application file for complete search history.

(56) References Cited

U.S. PATENT DOCUMENTS

| | | | | |
|---|---|---|---|---|
| 2012/0078667 | A1* | 3/2012 | Denker | G06Q 10/02 705/5 |
| 2021/0354036 | A1* | 11/2021 | Swann | A63F 13/86 |
| 2022/0207818 | A1* | 6/2022 | Allen | G06T 15/20 |

FOREIGN PATENT DOCUMENTS

WO        WO-2015184416 A1 * 12/2015  ............. G06F 3/017

* cited by examiner

*Primary Examiner* — Loi H Tran
(74) *Attorney, Agent, or Firm* — Eversheds Sutherland (US) LLP

(57) ABSTRACT

Systems, methods, and computer-readable media are disclosed for synchronization and presentation of multiple 3D content streams. Example methods may include determining a first content stream of 3D content to send to a user device, where movement of the user device causes presentation of different portions of the 3D content at the user device, and determining a first position of the user device. Some methods may include causing presentation of a first portion of the first content stream at the user device, where the first portion corresponds to the first position, determining a second content stream of 3D content, where movement of the user device causes presentation of different portions of the 3D content at the user device, and causing presentation of a second portion of the second content stream at the user device, where the second portion corresponds to the first position of the user device.

15 Claims, 8 Drawing Sheets

SYNCHRONIZATION AND PRESENTATION OF MULTIPLE 3D CONTENT STREAMS

BACKGROUND

Certain digital content, such as movies, television shows, live content, and other video content may be streamed using electronic devices. In some instances, live content, such as sporting events and concerts, may also be streamed. However, such streaming events may not be immersive or may provide a user experience that is vastly different than experiencing the live event in person. Moreover, interaction with certain types of 3D content may present technical challenges. Accordingly, synchronization and presentation of multiple 3D content streams may be desired.

BRIEF DESCRIPTION OF THE DRAWINGS

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. In the drawings, the left-most digit(s) of a reference numeral may identify the drawing in which the reference numeral first appears. The use of the same reference numerals indicates similar, but not necessarily the same or identical components. However, different reference numerals may be used to identify similar components as well. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Overview

Figure 1A:
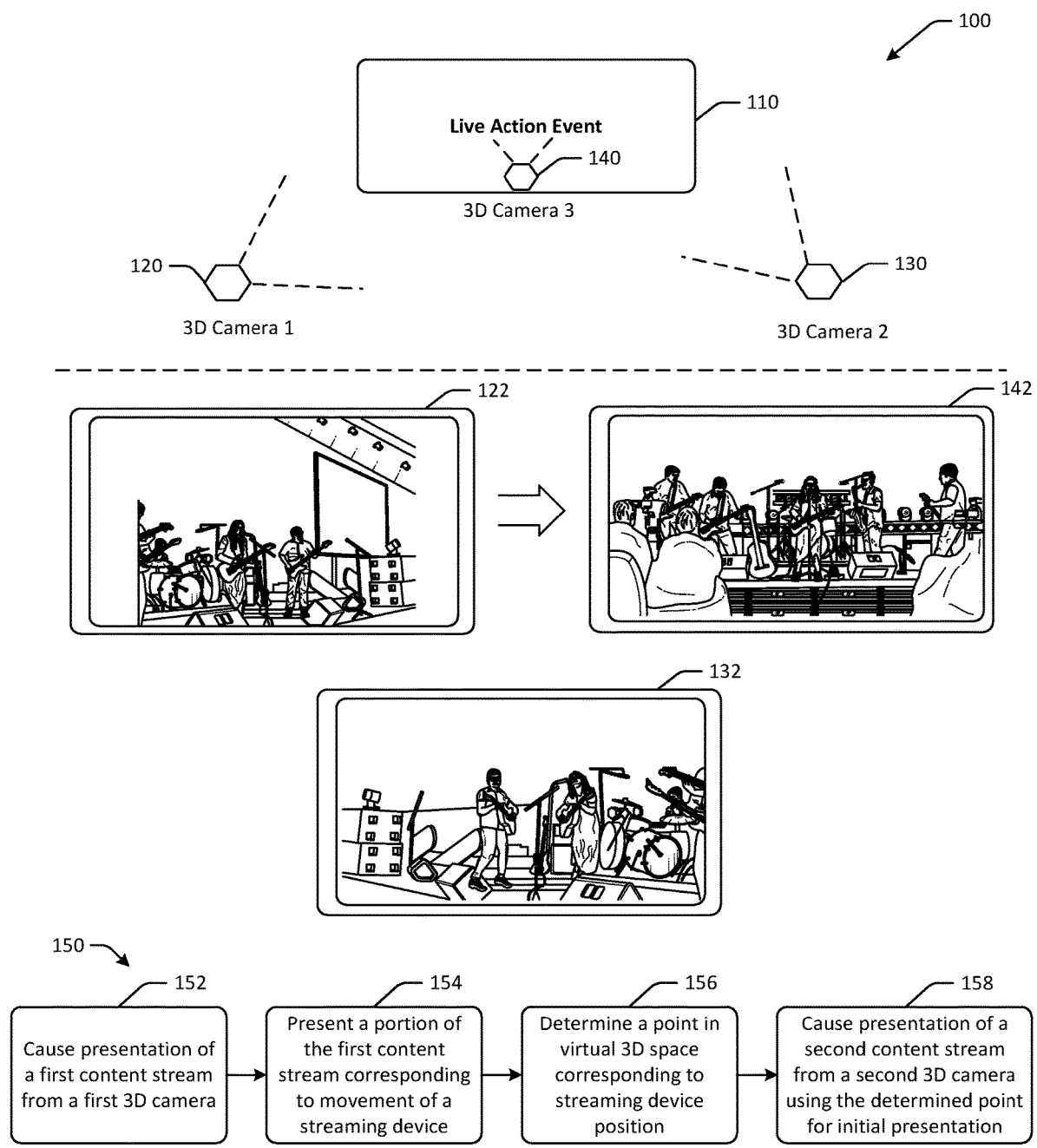
FIGS. 1A-1B are schematic illustrations of an example use case for synchronization and presentation of multiple 3D content streams in accordance with one or more example embodiments of the disclosure.

Digital content may include video content, such as movies, television shows, streaming shows (e.g., made for Amazon Prime, Netflix, etc.), and other video content. Users may stream content using one or more devices. For example, content can be streamed using virtual reality headsets or other equipment, smartphones, tablets, laptops, augmented reality hardware, and other types of computer systems. Three-dimensional (3D) content streams may include audio and video that is captured using one or more 3D cameras. For example, a 3D camera system may include multiple cameras (and optionally other hardware, such as microphones, etc.) arranged in different orientations that allow for capturing of content about 360 degrees of the 3D camera system. In some instances, the content captured by a 3D camera system can be streamed to users for consumption on any suitable device. The content streamed may include the video content, audio content, and may optionally include metadata related to a specific camera from which the content is captured, so as to allow the user to change their perspective based on manipulation of the device on which the content stream is being consumed. For example, a user wearing virtual reality hardware may physically move the hardware to change the perspective and/or camera from which the content stream is presented, thereby providing an immersive experience for the user. In addition, synchronization of presentation of content may be important for the user, such that switching between content streams from different cameras of a 3D camera system does not change a point in time from which the content begins streaming (e.g., the timing is aligned so that the content stream does not move forward or backwards relative to a previous stream, etc.). Moreover, synchronization of audio content during movement of a device and corresponding changes to content streams may be important to provide a high quality user experience.

Such issues may be more important during presentation of content streams from live events. For example, 3D content streams at locations such as concerts, sporting events, and other live events may present additional challenges, as users consuming the content streams may desire different points of view. In one example, a user may desire to consume a 3D content stream from a first 3D camera system at a location, such as onstage with a performer, and then switch to a 3D content stream from a second 3D camera system at another location, such as in a crowd of concertgoers. Such changes between content streams may present synchronization issues that can be amplified due to various factors, such as network connectivity. However, synchronization may be important for a user experience, and may enhance an immersive quality of the content streaming experience. Further, when switching between more than one content stream, the user experience may be diminished if there is a large discrepancy in content quality. For instance, if one content stream is significantly worse than the others, the user may not want to view the content stream anymore. Such discrepancies can occur due to network issues, content processing issues, and the like.

Embodiments of the disclosure provide synchronized presentation of content, such as audio and video content, across multiple 3D camera systems, so as to provide an immersive and improved user viewing experience that allows users to not only feel present as part of a livestreamed event, but also allows users to manipulate views and camera positions seamlessly. Some embodiments include capturing of 3D video content using a plurality of 3D camera systems that can be positioned at different physical locations within a live event venue, such that the event can be livestreamed and enjoyed virtually by those not physically present. Users may select from different viewing experiences based on the different positioning of the 3D camera systems, such as from onstage experiences, backstage experiences, sideline experiences, front row experiences, penalty box experiences, and so forth. The 3D nature of the content streams may provide an immersive experience, such that a user viewing an onstage stream can not only watch a performer from a few feet away, but can also turn and look out at the crowd to see the perspective of the performer. Some embodiments may be configured to modify content streams to include graphical representations of users viewing the content stream, such as graphical avatars, to allow users to digitally attend live events together. Any suitable device may be used to consume such 3D content streams, including accelerometer-enabled hand-held devices, gaming consoles, smart television devices, voice controlled devices (e.g., Echo, Echo Show, etc.), and other devices. Embodiments may therefore allow for users to switch viewing positions seamlessly without a noticeable break in playback or jarring audio change, and may also support group viewing with friends and family with everyone watching the feed in a synchronized fashion.

Figure 1B:
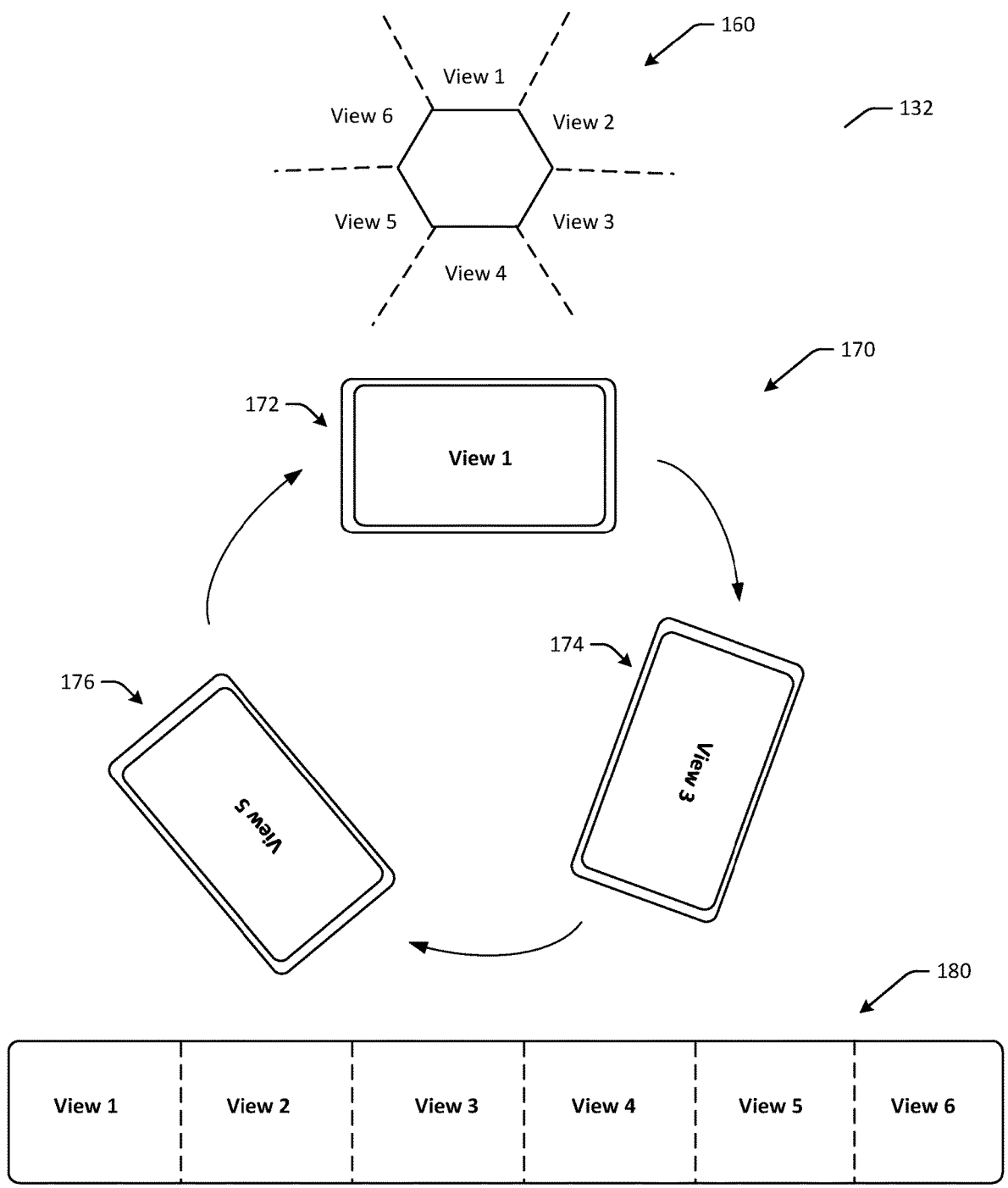

Referring to FIGS. 1A-1B, an example use case 100 for synchronization and presentation of multiple 3D video streams or content streams is depicted in accordance with one or more example embodiments of the disclosure. In the example of FIG. 1A, 3D content ("3D content" as used herein may include video content, audio content, metadata, and/or other data) may be streamed at a device, such as a smartphone. The 3D content may be captured from a number of 3D camera systems, such as a first 3D camera system 120, a second 3D camera system 130, a third 3D camera system 140, and so forth. Some embodiments may include two or more 3D camera systems. The 3D camera systems may be positioned at various locations at an event venue 110, so as to stream the live event. For example, the third 3D camera system 140 may be disposed onstage at the live event, which may be a concert. The first 3D camera system 120 may be disposed at a left side of the stage in the example of FIG. 1A, and the second 3D camera system 130 may be disposed at a right side of the stage in the example of FIG. 1A. Other embodiments may have different positioning and may include additional or fewer camera systems. The individual 3D camera systems may include multiple cameras. For example, in FIG. 1A, the 3D camera systems may include six different cameras arranged at different orientations, as represented by the hexagonal shape of the 3D camera systems in FIG. 1A. Other embodiments may utilize a greater or lesser number of cameras for each 3D camera system. For example, some embodiments may use eight cameras arranged at different orientations. The cameras may be used to stitch together a 3D video of the environment surrounding the respective 3D camera system (e.g., 360 degree coverage about the 3D camera system, etc.). The different cameras of the different 3D camera systems may provide portions of the 3D view.

The user may view different portions of the individual 3D camera system streams based on manipulation or movement of the device. The user may also switch between the 3D camera systems to consume different 3D content streams and to enjoy a fully immersive experience. For example, at a first point in time 122, the user may be consuming a portion of the 3D content stream from the first 3D camera system 120. The portion being consumed may be captured by the camera having a field of view represented by dashed lines in FIG. 1A. Accordingly, the user may be viewing a band onstage from a left side of the stage during the first point in time 122.

At a second point in time 142, the user may switch to consume a portion of the 3D content stream from the third 3D camera system 140. The portion being consumed may be captured by the camera having a field of view represented by dashed lines in FIG. 1A, which may be an onstage view. Accordingly, the user may be viewing a band onstage from an onstage viewpoint during the second point in time 142.

At a third point in time 132, the user may switch to consume a portion of the 3D content stream from the second 3D camera system 130. The portion being consumed may be captured by the camera having a field of view represented by dashed lines in FIG. 1A, which may be a view of the band onstage from a right side of the stage. Accordingly, the user may be viewing a band onstage from a right side of the stage viewpoint during the third point in time 142.

The user may physically manipulate the device, or may otherwise provide input commands, to change the views being streamed to the different viewpoints of the cameras for individual 3D camera systems. For example, the user may spin 180 degrees while streaming content from the third 3D camera system 140 to view a crowd that is in attendance from the band's perspective. As the user rotates, the content stream presented may change from a first camera of the third 3D camera system 140, to another camera, to another camera, and so forth, thereby allowing the user to feel immersed in the live performance and/or ambiance.

To synchronize the 3D content streams across the 3D camera systems, one or more remote servers, such as a streaming server, may perform operations in an example process flow 150. The streaming server may include at least one memory that stores computer-executable instructions and at least one processor configured to access the at least one memory and execute the computer-executable instructions to perform various actions or operations, such as one or more of the operations in the process flow 150 of FIG. 1.

At a first block 152, the streaming server may cause presentation of a first content stream from a first 3D camera. For example, the streaming server may cause presentation of a content stream at a user device, where the first content stream is captured using the first 3D camera system 120. In some embodiments, the content stream generated by the 3D camera systems may be singular and include data from all of the cameras at the 3D camera system, whereas in other embodiments, the 3D camera systems may generate multiple content streams, each corresponding to the individual cameras used to capture the 3D content at a particular 3D camera system.

At a second block 154, the streaming server may present a portion of the first content stream corresponding to movement of a streaming device, such as the smartphone in the example of FIG. 1A. In an embodiment, the content stream from a 3D camera system may include data for the content captured by multiple cameras of the same 3D camera system. The streaming server may determine or select a view, which may be represented as a portion of a content stream, to present at the streaming device based at least in part on a position of the streaming device. This may allow for a user to move within a virtual 3D space by physical movement of the device, as the view or portion of the content stream presented may change in correspondence with the movement of the user device. For example, a user moving their head while wearing streaming goggles or a streaming headset may seamlessly change content stream portions based at least in part on the amount of physical movement of the device. The user may therefore feel like they are present at the event.

At a third block 156, the streaming server may determine a point in virtual 3D space that corresponds to a streaming device position. For example, the streaming server may be configured to track a position of the streaming device in a 3D virtual space, such that if the user switches to a content stream from a different 3D camera system, a point of view or a subject of the camera system can be maintained, even if the camera providing the view is different. In the example of FIG. 1A, when the user switches between the first 3D camera system 120 and the second 3D camera system 130, the streaming server may use a default positioning of the content stream oriented towards the stage, provided that the user was viewing the stage using the first 3D camera system 120 before switching to the content stream from the second 3D camera system 130. The user may therefore enjoy a seamless experience without having to continually physically move a streaming device to orient to a desired viewpoint when changing content streams.

At a fourth block 158, the streaming server may cause presentation of a second content stream from a second 3D camera system using the determined point for initial presentation. Accordingly, the user may seamlessly switch between views from different 3D camera systems while maintaining a position in a three-dimensional space. Physical manipulation of a streaming device may be used to change the position of the user in the 3D virtual space, and may remain consistent across switches in content streams by providing the same initial view that the user was consuming immediately prior to switching content streams.

In FIG. 1B, a top view 160 of a 3D camera system, such as any of those discussed with respect to FIG. 1A, is depicted. The 3D camera system may include a number of cameras used to capture video content of 360 degrees about the 3D camera system. In the example of FIG. 1B, the 3D camera system may include six cameras, where each of the cameras has a different field of view with respect to the 3D camera system. For example, a first camera may have a first field of view, labeled View 1 in FIG. 1B, a second camera may have a second field of view labeled View 2, a third camera may have a third field of view labeled View 3, a fourth camera may have a fourth field of view labeled View 4, a fifth camera may have a fifth field of view labeled View 5, a sixth camera may have a sixth field of view labeled View 6, and so forth. Different embodiments may have different number and/or orientations of cameras. Although illustrated as discrete field of views for ease of illustration, there may be at least some overlap between the fields of view of adjacent cameras. Such overlap may allow for seamless transitions between viewpoints from the different cameras, such as if a user rotates their head while wearing a virtual reality headset.

To view content stream portions corresponding to the different fields of view, a user may physically move a streaming device, such as a headset, smartphone, or other streaming device. In the example of FIG. 1B, the user may move a device as shown in movements 170. At a first position 172, the position of the user device in a 3D space may correspond to View 1, or a content stream from the first camera of the 3D camera system. At a second position 174, the user may rotate the streaming device about 135 degrees, and the content stream corresponding to View 3 from the third camera may be presented. The user may rotate the streaming device another approximately 100 degrees, and the content stream corresponding to View 5 from the fifth camera may be presented. As the streaming device is rotated, intervening content streams may be presented during motion of the device. For instance, the content stream from View 2 of the second camera may be presented between the first position 172 and the second position 174, etc.

When stitched together, the content stream from the 3D camera system may create a video in the form 180, where a different view (or blend between adjacent views), is presented corresponding to position data associated with a streaming device (where applicable). For static devices, a user may manipulate the presented content stream via one or more inputs instead of physical movement, such as cursors, touch input, etc. The content stream from the 3D camera system may therefore provide a 360 degree view about the 3D camera system, and different portions of the content stream can be consumed based on physical positioning and/or other inputs at a streaming device.

Accordingly, a computer system, such as one or more streaming servers, may receive a first request from a user device (e.g., a streaming device, etc.) for a first live video stream from a first three-dimensional camera that is positioned at a first location at a venue, where the first live video stream includes 360 degree video of the first location. The streaming server may send the first live video stream to the user device, where content presented at the user device corresponds to a physical positioning of the user device, and where movement of the user device causes different portions of the 360 degree video captured by the first three-dimensional camera to be presented at the user device.

In some embodiments, the streaming server may determine a first physical position of the user device, and may cause presentation of a first portion of the 360 degree video captured by the first three-dimensional camera that corresponds to the first physical position. In other embodiments, the user device may determine a first physical position of the user device, and may present a first portion of the 360 degree video captured by the first three-dimensional camera that corresponds to the first physical position.

The streaming server may receive a second request from the user device for a second live video stream from a second three-dimensional camera that is positioned at a second location at the venue, where the second live video stream includes 360 degree video of the second location. Accordingly, the user may desire to switch from one camera system to another.

The streaming server may send the second live content stream to the user device, where content presented at the user device corresponds to a physical positioning of the user device, and where movement of the user device causes different portions of the 360 degree video captured by the second three-dimensional camera to be presented at the user device. The streaming server or the user device may determine a second physical position of the user device, and cause presentation of (or may present in the case of the user device) a second portion of the 360 degree video captured by the second three-dimensional camera that corresponds to the second physical position.

Example embodiments of the disclosure provide a number of technical features or technical effects. For example, in accordance with example embodiments of the disclosure, certain embodiments of the disclosure may automatically synchronize presentation of content streams from 3D camera systems across multiple 3D camera systems. Some embodiments may determine points of focus to maintain consistency across changes in camera systems by selecting an initial view corresponding to a most recent point of focus at a prior camera system. As a result of improved functionality, bandwidth utilization may be optimized, and latency and errors in streamed data may be reduced. The above examples of technical features and/or technical effects of example embodiments of the disclosure are merely illustrative and not exhaustive.

One or more illustrative embodiments of the disclosure have been described above. The above-described embodiments are merely illustrative of the scope of this disclosure and are not intended to be limiting in any way. Accordingly, variations, modifications, and equivalents of embodiments disclosed herein are also within the scope of this disclosure. The above-described embodiments and additional and/or alternative embodiments of the disclosure will be described in detail hereinafter through reference to the accompanying drawings.

Illustrative Process and Use Cases

Figure 2:
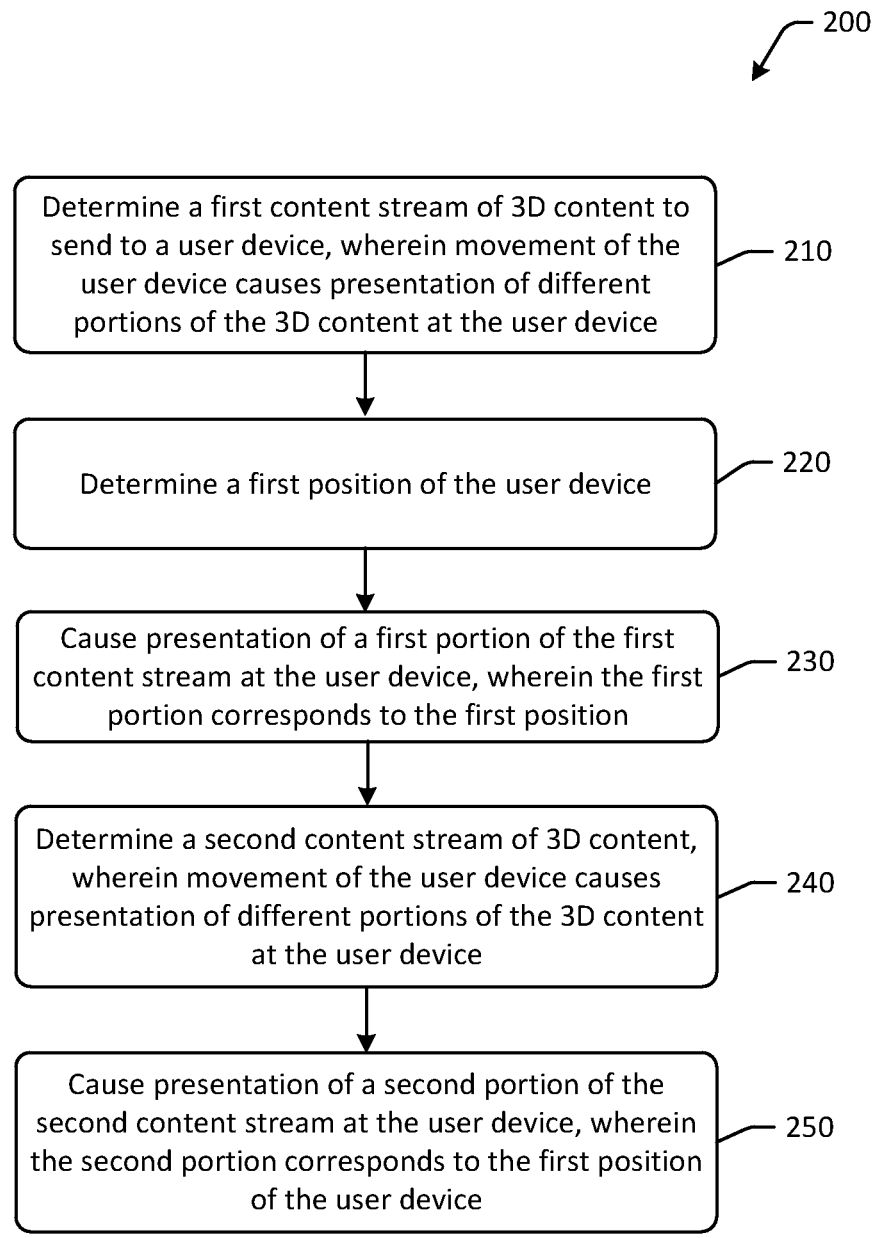
FIG. 2 is a schematic illustration of an example process flow for synchronization and presentation of multiple 3D content streams in accordance with one or more example embodiments of the disclosure.

FIG. 2 depicts an example process flow 200 for synchronization and presentation of multiple 3D content streams in accordance with one or more example embodiments of the disclosure. While example embodiments of the disclosure may be described in the context of live events, it should be appreciated that the disclosure is more broadly applicable to any type of streamable video content using multiple 3D camera systems. Some or all of the blocks of the process flows in this disclosure may be performed in a distributed manner across any number of devices. The operations of the process flow 200 may be optional and may be performed in a different order.

In one example embodiment, the process flow 200 may be executed by one or more remote servers, such as a streaming server, that is configured to stream content from 3D camera systems to one or more streaming devices, such as user devices. In other embodiments, the process flow 200 may be executed locally at a device, where the device may make certain determinations and send requests for certain content streams and/or portions of content streams to a streaming server.

At block 210 of the process flow 200, computer-executable instructions stored on a memory of a device, such as a remote server or a user device, may be executed to determine a first content stream of 3D content to send to a user device, wherein movement of the user device causes presentation of different portions of the 3D content at the user device. For example, a content streaming engine and/or content streaming module(s) executed at a server or a device may determine a first content stream of 3D content to send to a user device, wherein movement of the user device causes presentation of different portions of the 3D content at the user device. To determine the first content stream of 3D content, a user may make a selection as to a particular 3D camera system and/or a particular view of the 3D camera system, and the streaming server may receive an indication of the selection. The streaming server may determine a first content stream, which may be a portion of a single content stream from a 3D camera system, or may be an individual content stream from a camera of the 3D camera system, for presentation at the user device. Accordingly, data from one or more cameras at the 3D camera system may be used to provide a content stream, or the first content stream, to the user device for presentation. In the event that the position of the device corresponds to a view between two adjacent cameras, the content stream presented at the device may be formed using data from both cameras (e.g., the frames may be stitched together, etc.). In some embodiments, the 3D content may be a content stream that includes 360 degree video captured by the 3D camera system. The streaming device used to consume the 3D content stream may be configured to be moved so as to present portions of the 360 degree video during movement of the user device.

At block 220 of the process flow 200, computer-executable instructions stored on a memory of a device, such as a remote server or a user device, may be executed to determine a first position of the user device. For example, the content streaming engine executed at a device or a server may determine a first position of the user device. The position of the user device may be determined by the streaming server based at least in part on data received from the user device, such as accelerometer data, which may indicate movements in a datum or 3D virtual space of the user device. In another embodiment, the user device may receive a content stream that includes data from some or all of the cameras at a 3D camera system, and the device may modify the portion of the content presented at the device based at least in part on accelerometer data representing motion of the device.

At block 230 of the process flow 200, computer-executable instructions stored on a memory of a device, such as a remote server or a user device, may be executed to cause presentation of a first portion of the first content stream at the user device, wherein the first portion corresponds to the first position. For example, the content streaming engine executed at a device or server may cause presentation of a first portion of the first content stream at the user device, wherein the first portion corresponds to the first position. The server may determine a view and/or portion of content stream corresponding to the position of the device, and may send the portion to the user device for presentation. In another embodiment, the user device may determine the portion of the content stream to present, and may present the portion of the content stream or content stream at the device.

At block 240 of the process flow 200, computer-executable instructions stored on a memory of a device, such as a remote server or a user device, may be executed to determine a second content stream of 3D content, wherein movement of the user device causes presentation of different portions of the 3D content at the user device. For example, the content streaming engine executed at a device or a server may determine a second content stream of 3D content, wherein movement of the user device causes presentation of different portions of the 3D content at the user device. For example, a user may decide to switch content streams from a first 3D camera system to a second 3D camera system. The streaming server may therefore determine a second content stream of 3D content from the second 3D camera system. Presentation of different portions of the second content stream may be modified via manipulation of a streaming device on which the second content stream is presented. For example, similar to the first 3D camera system, movement of the user device causes presentation of different portions of the 3D content at the user device.

At block 250 of the process flow 200, computer-executable instructions stored on a memory of a device, such as a remote server or a user device, may be executed to cause presentation of a second portion of the second content stream at the user device, wherein the second portion corresponds to the first position of the user device. For example, the content streaming engine executed at a device or a server may cause presentation of a second portion of the second content stream at the user device, wherein the second portion corresponds to the first position of the user device. As a result, when the user switches from a first content stream from a first 3D camera system to a second content stream from a second 3D camera system, the initially presented portion of the content stream of the second 3D camera system may correspond to the first position of the user device. For example, if the user is viewing a portion of a content stream oriented towards an onstage performer from a left side of the stage, and the user switches to a 3D camera system on a right side of the stage, the initially presented portion of the second content stream may also be oriented towards the onstage performer. In this manner, the user may not have to continually adjust physical positioning in order to have a consistent viewing experience across different 3D camera systems. The first content stream or first content stream may be captured by a first three-dimensional camera at a first location of a venue, and the second content stream may be captured by a second three-dimensional camera at a second location of the venue. Movement of the user device in a three-dimensional space during viewing of the first content stream can be reflected in an initial viewing position of the second content stream.

Figure 3:
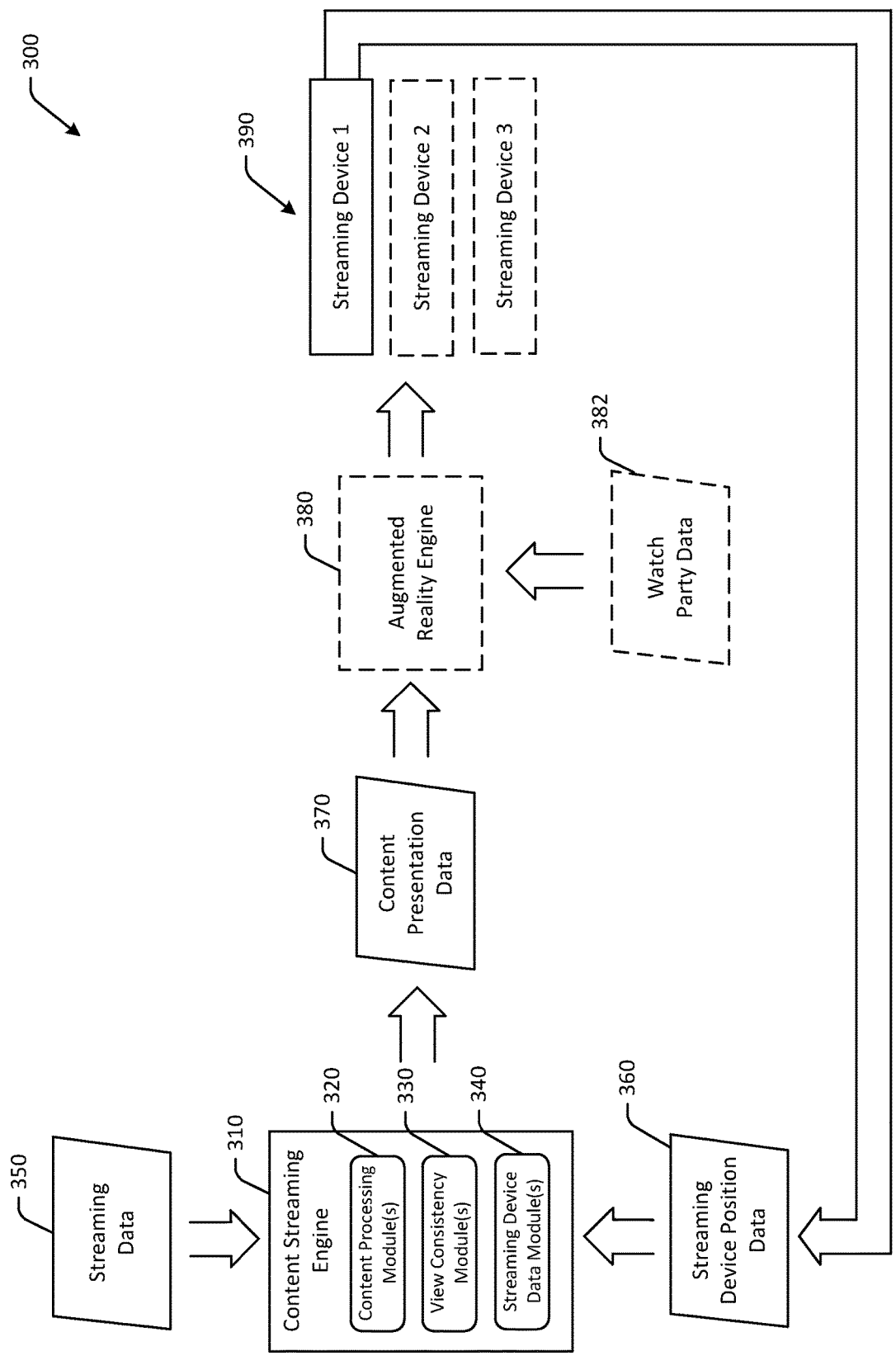
FIG. 3 is a schematic illustration of an example data flow for synchronization and presentation of multiple 3D content streams in accordance with one or more example embodiments of the disclosure.

FIG. 3 is a schematic illustration of an example data flow 300 for synchronization and presentation of multiple 3D content streams in accordance with one or more example embodiments of the disclosure. Different embodiments may include different, additional, or fewer inputs or outputs than those illustrated in the example of FIG. 3. The data flow 300 may be performed at one or more remote servers, such as a streaming server, configured to deliver content streams to a user device, or may optionally be performed at a user device locally.

In FIG. 3, a content streaming engine 310 and/or one or more content streaming module(s) may be configured to detect or determine one or more features or presentation aspects associated with streamed 3D content. The content streaming engine 310 may be stored at and/or executed by a user device or one or more remote servers. The content streaming engine 310 may include one or more modules or algorithms, and may be configured to output content presentation data 370, which may include content stream data and/or identifiers of portions of content for presentation at a device, 3D content stream data, metadata, and/or other content presentation related data. The content streaming engine 310 and an optional augmented reality engine 380 may be used in conjunction with each other to generate augmented reality modifications to content streams.

For example, the content streaming engine 310 may include one or more content processing module(s) 320, one or more view consistency module(s) 330, and/or one or more streaming device data module(s) 340. Additional or fewer, or different, modules may be included. The content processing module(s) 320 may be configured to process and/or analyze streamed content, including audio content and video content. For example, the content processing module(s) 320 may be configured to communicate with 3D camera systems, and to provide content streams of video and audio captured at the 3D camera systems to one or more streaming devices. The content processing module(s) 320 may be configured to determine portions of content streams that correspond to different views and/or orientations, as well as portions of content streams that correspond to streaming device positioning.

The view consistency module(s) 330 may be configured to maintain consistency of views across a number of different 3D camera systems and corresponding content streams. For example, the view consistency module(s) 330 may be configured to track states and/or function as a state machine to determine a current state of view of a content stream that is presented from a first 3D camera system, and to determine a corresponding view for a second content stream from a second 3D camera system. The view consistency module(s) 330 may use device positioning data to determine a state of a device and/or positioning in a 3D virtual space. In some embodiments, the view consistency module(s) 330 may be configured to receive device position data from the streaming device data module(s) 340.

The streaming device data module(s) 340 may be configured to determine various data associated with a particular streaming device, such as present network conditions, device positioning data, presently viewed portions of content streams, and the like. In some embodiments, the streaming device data module(s) 340 may be configured to ingest external data, such as streaming device position data 360 that may be received as feedback from one or more streaming devices 390 at which content streams are being presented. The streaming device data module(s) 340 may be configured to analyze and/or assess local network conditions. The streaming device data module(s) 340 may be configured to determine available bandwidth at a given point in time, as well as bandwidth consumed by individual content streams and/or bandwidth allocated to individual content streams. In some embodiments, the streaming device data module(s) 340 may be configured to determine an incremental amount by which a bitrate for a particular content stream can be increased, considering other factors such as bandwidth allocated to other content streams, bandwidth available to the device, and/or other factors.

The content streaming engine 310 may receive one or more inputs for which content presentation data 370 is to be generated. For example, the content streaming engine 310 may receive streaming data 350 from individual 3D camera systems. The streaming data 350 may include one or more content streams from individual 3D camera systems, and may include additional data, such as metadata, camera identifiers, and/or other data. The content streaming engine 310 may optionally receive resolution data and bitrate data associated with individual content streams.

The content streaming engine 310 may process the respective data associated with the content streams. For example, the streaming data 350 may be processed using one or more of the content processing module(s) 320, the view consistency module(s) 330, and/or the streaming device data module(s) 340.

Using one or more algorithms or modules, the content streaming engine 310 may generate the content presentation data 370 based at least in part on the streaming data 350. The content presentation data 370 may be used to render particular video content at a display of a user device. The content presentation data 370 may be in the form of a content stream, and/or may include markers or pointers identifying portions of content streams that are to be presented. As updated data is received by the content streaming engine 310, updated content presentation data 370 may be output.

The content presentation data 370 may optionally be input at an augmented reality engine 380. The augmented reality engine 380 may be configured to generate graphical content overlays and/or other augmented reality content for presentation with content streams. For example, the augmented reality engine 380 may receive watch party data 382 that may indicate a group of users that are watching a content stream together and/or at the same time. The watch party data 382 may include graphical avatar data for the users in the watch party, where the graphical avatar data can be used to generate graphical representations of the users in an ambient environment of a 3D camera system, so as to provide a virtual hangout functionality, as discussed in more detail with respect to FIG. 5. The augmented reality engine 380 may be configured to generate overlays at predetermined positions and/or at random positions that show the graphical avatars as part of a content stream.

The augmented reality engine 380 may ingest the content presentation data 370 and may cause delivery of a modified content stream and/or instructions to a rendered at one or more streaming devices 390. For example, content streams may be delivered for presentation at a first streaming device, a second streaming device, a third streaming device, and so forth. Feedback from the respective devices, such as positioning feedback, may be sent as a signal back to the streaming server and used to determine portions of a content stream that are to be presented at the streaming device.

Figure 4:
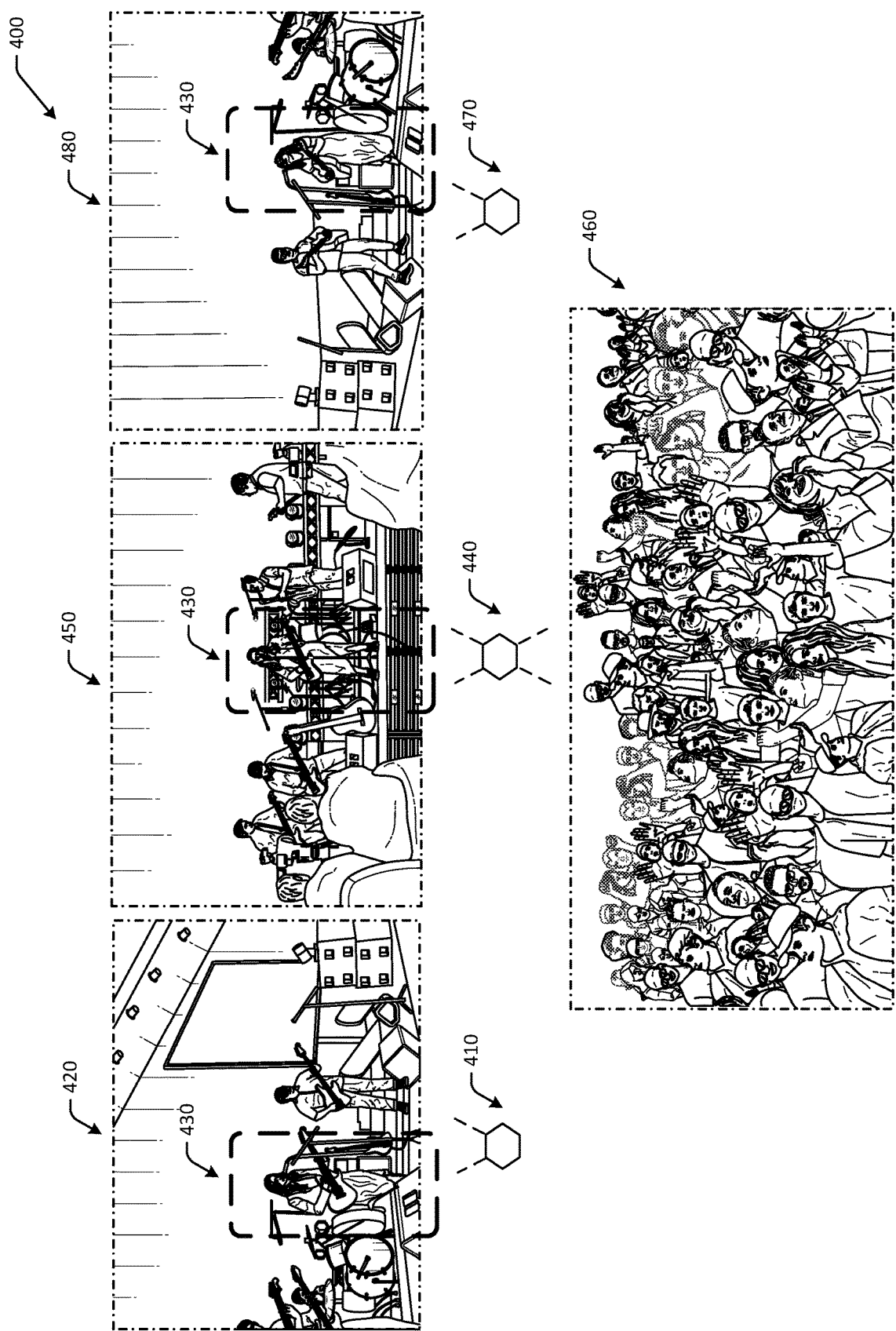
FIG. 4 is a schematic illustration of example synchronization and presentation of multiple 3D content streams in accordance with one or more example embodiments of the disclosure.

FIG. 4 is a schematic illustration 400 of example synchronization and presentation of multiple 3D content streams in accordance with one or more example embodiments of the disclosure. In FIG. 4, content streams are represented by individual frames. The content may be any suitable livestream content. Other embodiments may have a different camera system arrangement than that illustrated in FIG. 4. The operations described with respect to FIG. 4 may be performed in any suitable order across any number of devices, and may include operations that are performed at least partially concurrently.

In the example of FIG. 4, a set of camera systems may be positioned at different locations at a venue, so as to livestream an event, such as a concert. A first camera system 410 may be positioned to the left of a stage, a second camera system 440 may be positioned in front of the stage, and a third camera system 470 may be positioned to the right of the stage. The camera systems may be 3D camera systems in that the camera systems may be configured to provide 360 degree views from their respective positions.

Users viewing the event virtually may stream content streams from any of the camera systems in any of the available views. In some instances, users may switch between the different content streams from the different camera systems. In such instances, consistency between the initial view at the new camera system and the immediate prior view from the previous camera system may provide an improved user experience, as the user may not have to readjust positioning manually. For example, if the user is streaming a first view 420 from the first camera system 410 of the stage, and switches to the second camera system 440, the initial view presented from the second camera system 440 may be a second view 450 that includes the stage. In this manner, the user may view the same focus of the content stream (e.g., where the focus is the onstage act, etc.) across the different camera systems. Similarly, if the user then switches to the third camera system 470, the initial view presented from the third camera system 470 may be a third view 480 of the stage. Accordingly, although the particular views are different in that different camera orientations from the individual camera systems are used to provide the views, the user may experience a consistent view across changes in camera systems, and may not have to manually adjust positioning when switching between the different camera systems.

In some embodiments, a streaming server may determine a position of a user device used to stream content during presentation of a first content stream from a first camera system, and may determine a portion of a second content stream from a different camera system that corresponds to the first position. The streaming server may cause presentation of a portion of the second content stream from the different camera system that corresponds to the first position.

In some embodiments, anchor points may be used in a virtual 3D space to maintain a streaming device position, such that the user can manipulate positioning consistently across a number of camera systems without having to turn full circles, etc. Accordingly, in some embodiments, a user device and/or a streaming server may associate a first position of a user device with a first portion of a first content stream from a first camera system and a second portion of a second content stream from a second camera system as an anchor point, such that rotation from the user device results in different changes to viewpoints at the different camera systems. In another example, a user device and/or streaming server may determine a first physical position of the user device at a time a request to change camera systems is sent by the user device, and may initially present, or cause presentation of, a portion of a 360 degree video captured by the second three-dimensional camera that corresponds to the physical position when the second live content stream is initially received by the user device. As a result, a first orientation of a subject in the first portion of the first content stream relative to a first camera may be different than a second orientation of the subject in the third portion of the second content stream relative to a second camera. This can be seen in the example of FIG. 4, where the stage is at different positions relative to the different camera systems.

In some embodiments, a focal point of a content stream may be used to provide consistent viewing experiences across different camera systems. For example, in FIG. 4, a first focal point 430 of the first view 420 may be determined to be a lead singer. The focal point may be determined based at least in part on computer vision processing of the content stream, user input, and/or other signals. Accordingly, if the user switches to the second camera system 440, the initially presented view may be of the lead singer, such that the first focal point 430 is maintained across both the first camera system 410 and the second camera system 440. If the user again switches to the third camera system 470, the first focal point 430 may again be initially presented. In one example, a streaming server may determine a subject or focal point 430 of a first portion of a first content stream, and may determine a second portion of a second content stream that includes the subject or focal point 430, and may initially cause the user device to present the second portion when switching from the first content stream to the second content stream of the respective camera systems. However, if the user rotates 180 degrees, while at the second camera system 440, such that a crowd in in a fourth view 460, the crowd may be the focal point if the user switches to the third camera system 470, and a view of the crowd may be initially presented.

In some embodiments, a user device and/or streaming server may determine a first portion of a 360 degree video captured by the first three-dimensional camera 410 at a time a first request is sent by the user device, and may determine a subject of the first portion. The user device and/or streaming server may determine a second portion of the 360 degree video captured by the second three-dimensional camera 440 that corresponds to the first portion, where the subject is present in the second portion, and may initially present the second portion of the 360 degree video captured by the second three-dimensional camera, and may associate a physical position of the user device in a three-dimensional ambient environment of the user device with the respective portions of the content streams from the different camera systems.

Figure 5:
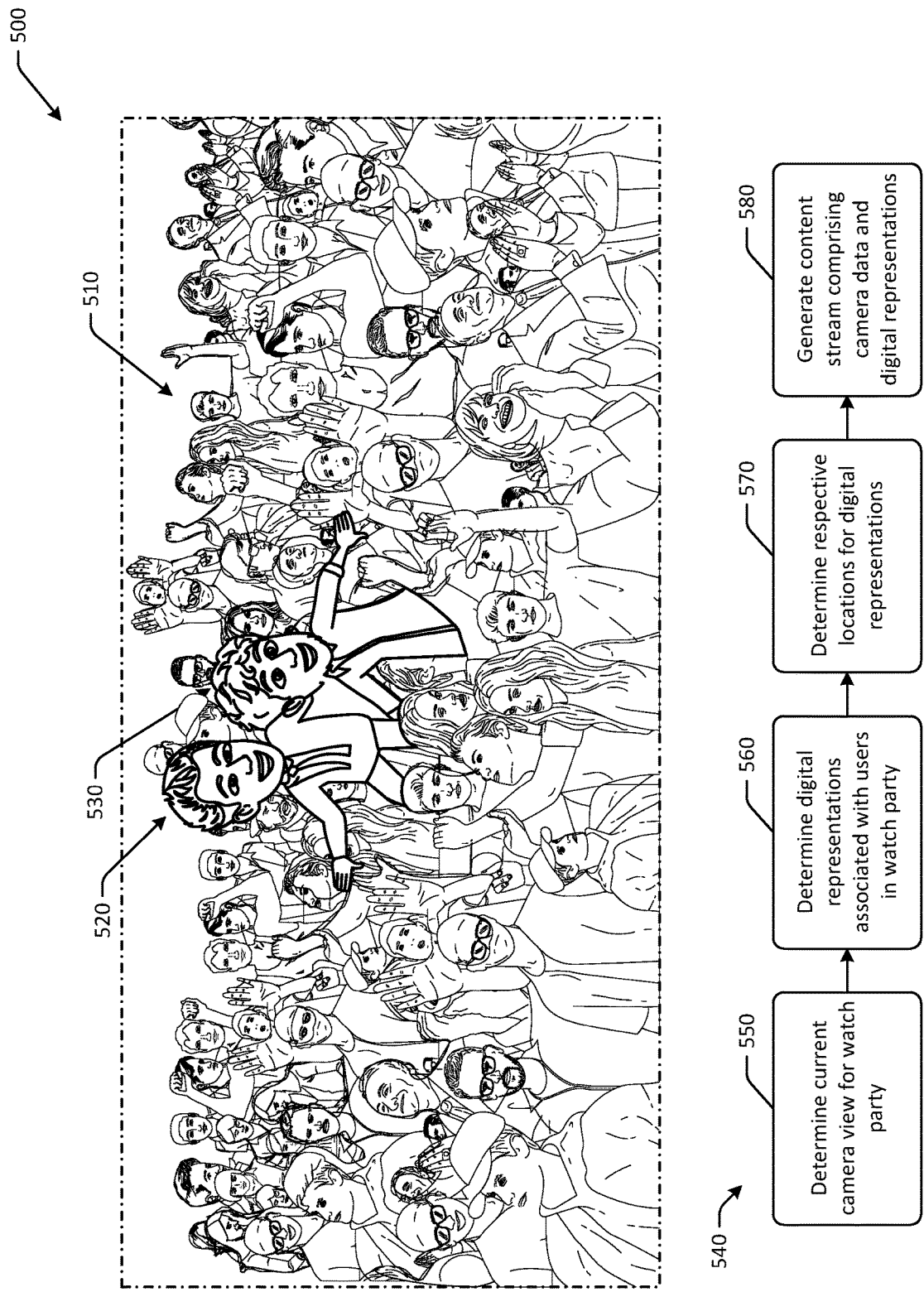
FIG. 5 is a schematic illustration of an example use case of synchronization and presentation of multiple 3D content streams with graphical avatars in accordance with one or more example embodiments of the disclosure.

FIG. 5 is a schematic illustration of an example use case 500 of synchronization and presentation of multiple 3D content streams with graphical avatars in accordance with one or more example embodiments of the disclosure. In FIG. 5, content streams are represented by individual frames. The content may be any suitable livestream content. Other embodiments may have a different camera system arrangement than that illustrated in FIG. 4. The operations of the process flow in FIG. 5 may be performed in any suitable order across any number of devices, and may include operations that are performed at least partially concurrently.

In FIG. 5, users may view content streams together virtually as part of a watch party. For example, users may join a watch party together and may view the same content stream on different devices. In the example of a concert, such as that of FIG. 4, the users may be viewing the crowd 510. To provide an immersive viewing experience, one or more remote servers may be configured to cause presentation of a graphical avatar at one or more user devices during presentation of a content stream. For example, a watch party may include User A and User B. User A may be associated with a first graphical avatar 520, and User B may be associated with a second graphical avatar 530. The first graphical avatar 520 and the second graphical avatar 530 may be presented as digital overlays with the crowd to provide an augmented reality experience. The first graphical avatar 520 and the second graphical avatar 530 may be presented at predetermined locations, or may be dynamically positioned based on the view presented in a content stream.

In some embodiments, the streaming server may be configured to execute a process flow 540 to present graphical avatars. At a first block 550, the streaming server may determine a current camera view for a watch party, such as a view of the crowd at a concert. At a second block 560, the streaming server may determine digital representations associated with users in the watch party, such as the first graphical avatar 520 and the second graphical avatar 530. At a third block 570, the streaming server may determine respective locations for the digital representations. The locations may be predetermined, such as particular seat numbers or marked locations, or may determined dynamically using machine learning and/or computer vision processing. At a fourth block 580, the streaming server may generate a content stream that includes the camera data and the digital representations, such as the frame 510 presented in the example of FIG. 5.

Figure 6:
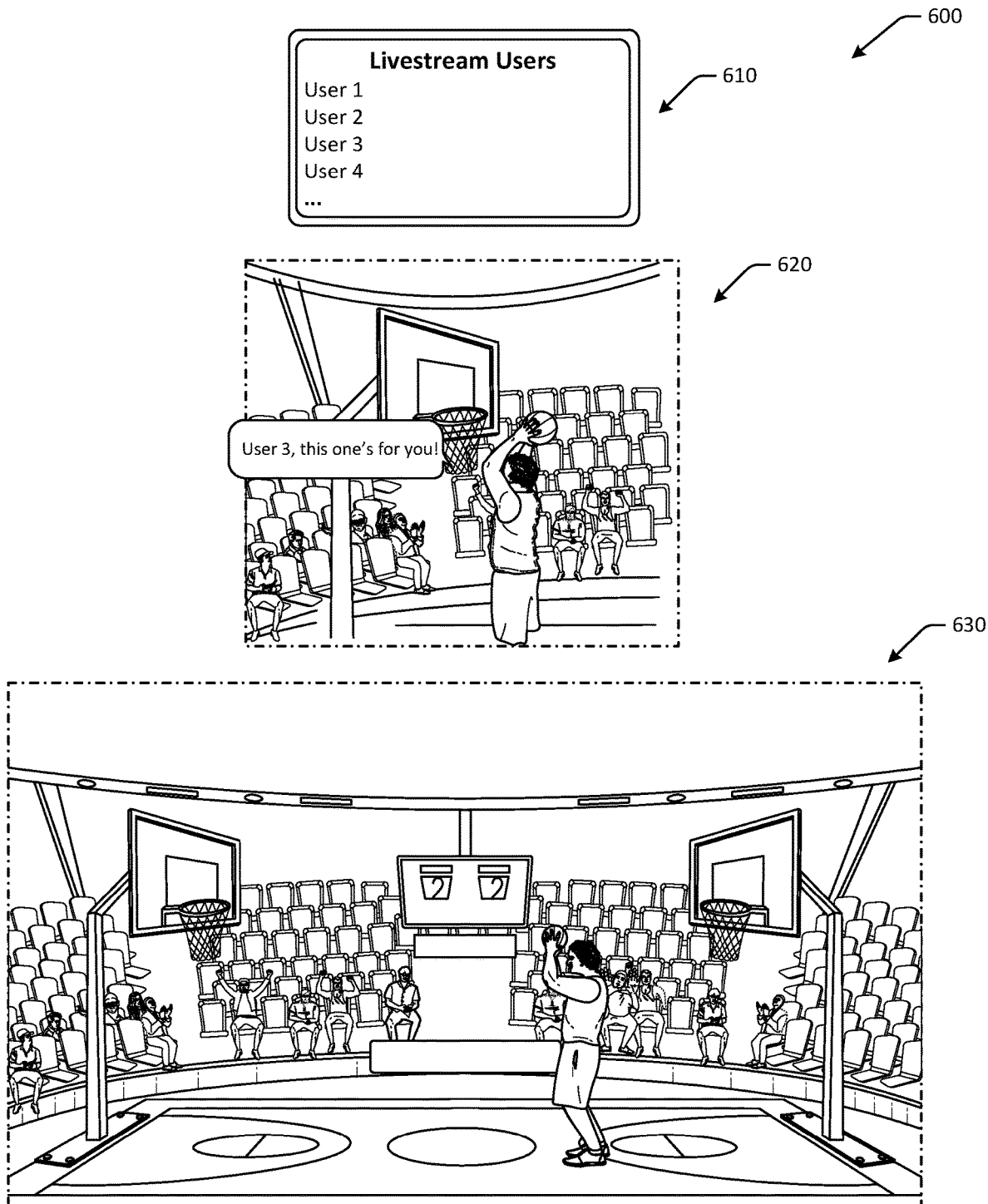
FIG. 6 is a schematic illustration of an example use case of two-way immersive live streaming in accordance with one or more example embodiments of the disclosure.

FIG. 6 is a schematic illustration of an example use case 600 of two-way immersive live streaming in accordance with one or more example embodiments of the disclosure. In FIG. 6, content streams are represented by individual frames. The content may be a live event. The illustration of FIG. 6 is provided for illustrative purposes only.

In some embodiments, a user identifiers of users that are consuming a livestream of content 610 may be presented to performers or other individuals that are in the vicinity of a 3D camera system. The performers or other individuals may therefore engage with the users that are virtually present, such as by saying the user identifier or name of the user. For example, the users that are consuming a livestream of content 610 may be users currently viewing a content streaming from a first 3D camera system at a basketball game. At a first instance 620, a basketball player may see the users that are consuming the livestream, and may shout out a username, such as by saying "User 3 this one's for you" during a slam dunk. Accordingly, the users viewing the livestream may feel immersed and engaged in the viewing experience. Users may switch to another 3D camera system that is courtside, as shown at a second point in time 630, that may allow for up close interaction with performers during pregame workouts or other times. The streaming server and/or another computer system may therefore cause presentation of an identifier associated with a user device (and/or a user account using a user device) at a display positioned at a physical location of a first content stream while the user device is receiving the first content stream or the second content stream, and the performer or another user may engage with those in virtual attendance directly.

One or more operations of the methods, process flows, or use cases of FIGS. 1-6 may have been described above as being performed by a user device, or more specifically, by one or more program module(s), applications, or the like executing on a device. It should be appreciated, however, that any of the operations of the methods, process flows, or use cases of FIGS. 1-6 may be performed, at least in part, in a distributed manner by one or more other devices, or more specifically, by one or more program module(s), applications, or the like executing on such devices. In addition, it should be appreciated that the processing performed in response to the execution of computer-executable instructions provided as part of an application, program module, or the like may be interchangeably described herein as being performed by the application or the program module itself or by a device on which the application, program module, or the like is executing. While the operations of the methods, process flows, or use cases of FIGS. 1-6 may be described in the context of the illustrative devices, it should be appreciated that such operations may be implemented in connection with numerous other device configurations.

The operations described and depicted in the illustrative methods, process flows, and use cases of FIGS. 1-6 may be carried out or performed in any suitable order as desired in various example embodiments of the disclosure. Additionally, in certain example embodiments, at least a portion of the operations may be carried out in parallel. Furthermore, in certain example embodiments, less, more, or different operations than those depicted in FIGS. 1-6 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Illustrative Device Architecture

Figure 7:
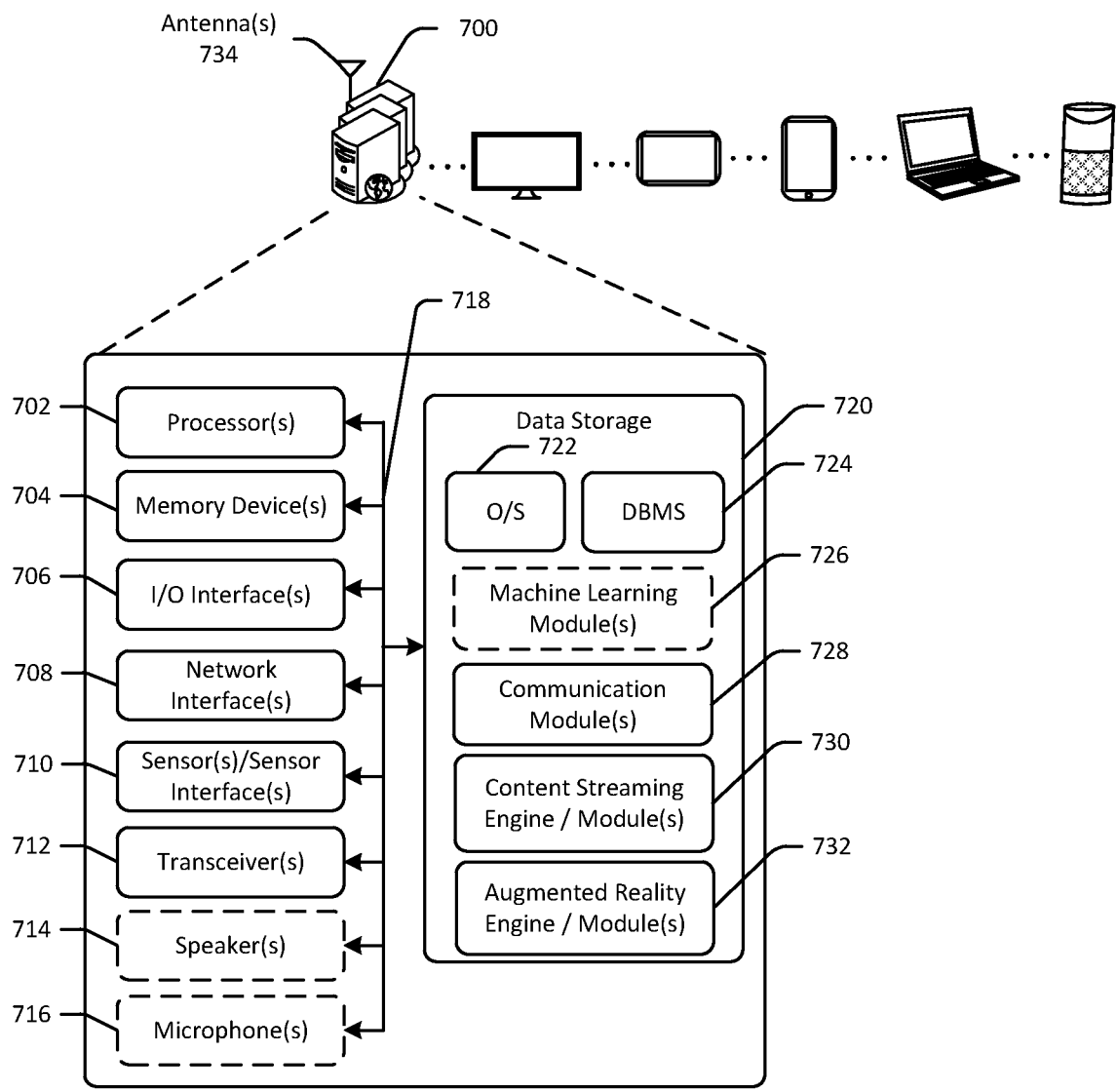
FIG. 7 is a schematic block diagram of an illustrative device in accordance with one or more example embodiments of the disclosure.

FIG. 7 is a schematic block diagram of an illustrative remote server 700 in accordance with one or more example embodiments of the disclosure. The remote server 700 may include any suitable computing device capable of receiving and/or sending data including, but not limited to, a mobile device such as a smartphone, tablet, e-reader, wearable device, or the like; a desktop computer; a laptop computer; a content streaming device; a set-top box; or the like. The remote server 700 may correspond to an illustrative device configuration for the remote server and/or streaming devices of FIGS. 1-6.

The remote server 700 may be configured to communicate via one or more networks with one or more servers, search engines, user devices, or the like. In some embodiments, a single remote server or single group of remote servers may be configured to perform more than one type of content streaming-related determinations and/or machine learning functionality.

Example network(s) may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the remote server 700 may include one or more processors (processor(s)) 702, one or more memory devices 704 (generically referred to herein as memory 704), one or more input/output (I/O) interface(s) 706, one or more network interface(s) 708, one or more sensors or sensor interface(s) 710, one or more transceivers 712, one or more optional speakers 714, one or more optional microphones 716, and data storage 720. The remote server 700 may further include one or more buses 718 that functionally couple various components of the remote server 700. The remote server 700 may further include one or more antenna(s) 734 that may include, without limitation, a cellular antenna for transmitting or receiving signals to/from a cellular network infrastructure, an antenna for transmitting or receiving Wi-Fi signals to/from an access point (AP), a Global Navigation Satellite System (GNSS) antenna for receiving GNSS signals from a GNSS satellite, a Bluetooth antenna for transmitting or receiving Bluetooth signals, a Near Field Communication (NFC) antenna for transmitting or receiving NFC signals, and so forth. These various components will be described in more detail hereinafter.

The bus(es) 718 may include at least one of a system bus, a memory bus, an address bus, or a message bus, and may permit exchange of information (e.g., data (including computer-executable code), signaling, etc.) between various components of the remote server 700. The bus(es) 718 may include, without limitation, a memory bus or a memory controller, a peripheral bus, an accelerated graphics port, and so forth. The bus(es) 718 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

The memory 704 of the remote server 700 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 704 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 704 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 720 may include removable storage and/or non-removable storage including, but not limited to, magnetic storage, optical disk storage, and/or tape storage. The data storage 720 may provide non-volatile storage of computer-executable instructions and other data. The memory 704 and the data storage 720, removable and/or non-removable, are examples of computer-readable storage media (CRSM) as that term is used herein.

The data storage 720 may store computer-executable code, instructions, or the like that may be loadable into the memory 704 and executable by the processor(s) 702 to cause the processor(s) 702 to perform or initiate various operations. The data storage 720 may additionally store data that may be copied to memory 704 for use by the processor(s) 702 during the execution of the computer-executable instructions. Moreover, output data generated as a result of execution of the computer-executable instructions by the processor(s) 702 may be stored initially in memory 704, and may ultimately be copied to data storage 720 for non-volatile storage.

More specifically, the data storage 720 may store one or more operating systems (O/S) 722; one or more database management systems (DBMS) 724; and one or more program module(s), applications, engines, computer-executable code, scripts, or the like such as, for example, one or more optional machine learning module(s) 726, one or more communication module(s) 728, one or more content streaming engine/module(s) 730, and/or one or more augmented reality engine/module(s) 732. Some or all of these module(s) may be sub-module(s). Any of the components depicted as being stored in data storage 720 may include any combination of software, firmware, and/or hardware. The software and/or firmware may include computer-executable code, instructions, or the like that may be loaded into the memory 704 for execution by one or more of the processor(s) 702. Any of the components depicted as being stored in data storage 720 may support functionality described in reference to correspondingly named components earlier in this disclosure.

The data storage 720 may further store various types of data utilized by components of the remote server 700. Any data stored in the data storage 720 may be loaded into the memory 704 for use by the processor(s) 702 in executing computer-executable code. In addition, any data depicted as being stored in the data storage 720 may potentially be stored in one or more datastore(s) and may be accessed via the DBMS 724 and loaded in the memory 704 for use by the processor(s) 702 in executing computer-executable code. The datastore(s) may include, but are not limited to, databases (e.g., relational, object-oriented, etc.), file systems, flat files, distributed datastores in which data is stored on more than one node of a computer network, peer-to-peer network datastores, or the like. In FIG. 7, the datastore(s) may include, for example, user preference information, active streaming data, available bandwidth data, historical network performance information, and other information.

The processor(s) 702 may be configured to access the memory 704 and execute computer-executable instructions loaded therein. For example, the processor(s) 702 may be configured to execute computer-executable instructions of the various program module(s), applications, engines, or the like of the remote server 700 to cause or facilitate various operations to be performed in accordance with one or more embodiments of the disclosure. The processor(s) 702 may include any suitable processing unit capable of accepting data as input, processing the input data in accordance with stored computer-executable instructions, and generating output data. The processor(s) 702 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 702 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 702 may be capable of supporting any of a variety of instruction sets.

Referring now to functionality supported by the various program module(s) depicted in FIG. 7, the optional machine learning module(s) 726 may include computer-executable instructions, code, or the like that responsive to execution by one or more of the processor(s) 702 may perform functions including, but not limited to, determining approval of requests to improve bitrate, determining rejection of requests to improve bitrate, determining current streaming performance values, determining bandwidth usage, determining or detecting actions and/events, generating one or more machine learning models or algorithms, determining or classifying objects or actions, determining frames of content, and the like.

The communication module(s) 728 may include computer-executable instructions, code, or the like that responsive to execution by one or more of the processor(s) 702 may perform functions including, but not limited to, communicating with one or more devices, for example, via wired or wireless communication, communicating with remote servers, communicating with remote datastores, sending or receiving notifications or commands/directives, communicating with cache memory data, communicating with user devices, and the like.

The content streaming engine/module(s) 730 may include computer-executable instructions, code, or the like that responsive to execution by one or more of the processor(s) 702 may perform functions including, but not limited to, analyzing digital content, detecting servers and/or communicating with egress systems, determining streaming content quality values, determining streaming content, determining or analyzing audio files, identifying certain portions of content, extracting segments of content, generating video files, generating 3D content streams, and the like.

The augmented reality engine/module(s) 732 may include computer-executable instructions, code, or the like that responsive to execution by one or more of the processor(s) 702 may perform functions including, but not limited to, determining video files, generating digital representations and/or graphical content overlays, determining three dimensional positioning and/or datum positioning, determining user device movements, determining content screen resolution, and the like.

Referring now to other illustrative components depicted as being stored in the data storage 720, the O/S 722 may be loaded from the data storage 720 into the memory 704 and may provide an interface between other application software executing on the remote server 700 and hardware resources of the remote server 700. More specifically, the O/S 722 may include a set of computer-executable instructions for managing hardware resources of the remote server 700 and for providing common services to other application programs (e.g., managing memory allocation among various application programs). In certain example embodiments, the O/S 722 may control execution of the other program module(s) to for content rendering. The O/S 722 may include any operating system now known or which may be developed in the future including, but not limited to, any server operating system, any mainframe operating system, or any other proprietary or non-proprietary operating system.

The DBMS 724 may be loaded into the memory 704 and may support functionality for accessing, retrieving, storing, and/or manipulating data stored in the memory 704 and/or data stored in the data storage 720. The DBMS 724 may use any of a variety of database models (e.g., relational model, object model, etc.) and may support any of a variety of query languages. The DBMS 724 may access data represented in one or more data schemas and stored in any suitable data repository including, but not limited to, databases (e.g., relational, object-oriented, etc.), file systems, flat files, distributed datastores in which data is stored on more than one node of a computer network, peer-to-peer network datastores, or the like. In those example embodiments in which the remote server 700 is a mobile device, the DBMS 724 may be any suitable light-weight DBMS optimized for performance on a mobile device.

Referring now to other illustrative components of the remote server 700, the input/output (I/O) interface(s) 706 may facilitate the receipt of input information by the remote server 700 from one or more I/O devices as well as the output of information from the remote server 700 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the remote server 700 or may be separate. The I/O devices may further include, for example, any number of peripheral devices such as data storage devices, printing devices, and so forth.

The I/O interface(s) 706 may also include an interface for an external peripheral device connection such as universal serial bus (USB), FireWire, Thunderbolt, Ethernet port or other connection protocol that may connect to one or more networks. The I/O interface(s) 706 may also include a connection to one or more of the antenna(s) 734 to connect to one or more networks via a wireless local area network (WLAN) (such as Wi-Fi) radio, Bluetooth, ZigBee, and/or a wireless network radio, such as a radio capable of communication with a wireless communication network such as a Long Term Evolution (LTE) network, WiMAX network, 3G network, ZigBee network, etc.

The remote server 700 may further include one or more network interface(s) 708 via which the remote server 700 may communicate with any of a variety of other systems, platforms, networks, devices, and so forth. The network interface(s) 708 may enable communication, for example, with one or more wireless routers, one or more host servers, one or more web servers, and the like via one or more of networks.

The antenna(s) 734 may include any suitable type of antenna depending, for example, on the communications protocols used to transmit or receive signals via the antenna(s) 734. Non-limiting examples of suitable antennas may include directional antennas, non-directional antennas, dipole antennas, folded dipole antennas, patch antennas, multiple-input multiple-output (MIMO) antennas, or the like. The antenna(s) 734 may be communicatively coupled to one or more transceivers 712 or radio components to which or from which signals may be transmitted or received.

As previously described, the antenna(s) 734 may include a cellular antenna configured to transmit or receive signals in accordance with established standards and protocols, such as Global System for Mobile Communications (GSM), 3G standards (e.g., Universal Mobile Telecommunications System (UMTS), Wideband Code Division Multiple Access (W-CDMA), CDMA2000, etc.), 4G standards (e.g., Long-Term Evolution (LTE), WiMax, etc.), direct satellite communications, or the like.

The antenna(s) 734 may additionally, or alternatively, include a Wi-Fi antenna configured to transmit or receive signals in accordance with established standards and protocols, such as the IEEE 802.11 family of standards, including via 2.4 GHz channels (e.g., 802.11b, 802.11g, 802.11n), 5 GHz channels (e.g., 802.11n, 802.11ac), or 60 GHz channels (e.g., 802.11ad). In alternative example embodiments, the antenna(s) 734 may be configured to transmit or receive radio frequency signals within any suitable frequency range forming part of the unlicensed portion of the radio spectrum.

The antenna(s) 734 may additionally, or alternatively, include a GNSS antenna configured to receive GNSS signals from three or more GNSS satellites carrying time-position information to triangulate a position therefrom. Such a GNSS antenna may be configured to receive GNSS signals from any current or planned GNSS such as, for example, the Global Positioning System (GPS), the GLONASS System, the Compass Navigation System, the Galileo System, or the Indian Regional Navigational System.

The transceiver(s) 712 may include any suitable radio component(s) for—in cooperation with the antenna(s) 734—transmitting or receiving radio frequency (RF) signals in the bandwidth and/or channels corresponding to the communications protocols utilized by the remote server 700 to communicate with other devices. The transceiver(s) 712 may include hardware, software, and/or firmware for modulating, transmitting, or receiving—potentially in cooperation with any of antenna(s) 734— communications signals according to any of the communications protocols discussed above including, but not limited to, one or more Wi-Fi and/or Wi-Fi direct protocols, as standardized by the IEEE 802.11 standards, one or more non-Wi-Fi protocols, or one or more cellular communications protocols or standards. The transceiver(s) 712 may further include hardware, firmware, or software for receiving GNSS signals. The transceiver(s) 712 may include any known receiver and baseband suitable for communicating via the communications protocols utilized by the remote server 700. The transceiver(s) 712 may further include a low noise amplifier (LNA), additional signal amplifiers, an analog-to-digital (A/D) converter, one or more buffers, a digital baseband, or the like.

The sensor(s)/sensor interface(s) 710 may include or may be capable of interfacing with any suitable type of sensing device such as, for example, inertial sensors, force sensors, thermal sensors, and so forth. Example types of inertial sensors may include accelerometers (e.g., MEMS-based accelerometers), gyroscopes, and so forth.

The optional speaker(s) 714 may be any device configured to generate audible sound. The optional microphone(s) 716 may be any device configured to receive analog sound input or voice data.

It should be appreciated that the program module(s), applications, computer-executable instructions, code, or the like depicted in FIG. 7 as being stored in the data storage 720 are merely illustrative and not exhaustive and that processing described as being supported by any particular module may alternatively be distributed across multiple module(s) or performed by a different module. In addition, various program module(s), script(s), plug-in(s), Application Programming Interface(s) (API(s)), or any other suitable computer-executable code hosted locally on the remote server 700, and/or hosted on other computing device(s) accessible via one or more networks, may be provided to support functionality provided by the program module(s), applications, or computer-executable code depicted in FIG. 7 and/or additional or alternate functionality. Further, functionality may be modularized differently such that processing described as being supported collectively by the collection of program module(s) depicted in FIG. 7 may be performed by a fewer or greater number of module(s), or functionality described as being supported by any particular module may be supported, at least in part, by another module. In addition, program module(s) that support the functionality described herein may form part of one or more applications executable across any number of systems or devices in accordance with any suitable computing model such as, for example, a client-server model, a peer-to-peer model, and so forth. In addition, any of the functionality described as being supported by any of the program module(s) depicted in FIG. 7 may be implemented, at least partially, in hardware and/or firmware across any number of devices.

It should further be appreciated that the remote server 700 may include alternate and/or additional hardware, software, or firmware components beyond those described or depicted without departing from the scope of the disclosure. More particularly, it should be appreciated that software, firmware, or hardware components depicted as forming part of the remote server 700 are merely illustrative and that some components may not be present or additional components may be provided in various embodiments. While various illustrative program module(s) have been depicted and described as software module(s) stored in data storage 720, it should be appreciated that functionality described as being supported by the program module(s) may be enabled by any combination of hardware, software, and/or firmware. It should further be appreciated that each of the above-mentioned module(s) may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other module(s). Further, one or more depicted module(s) may not be present in certain embodiments, while in other embodiments, additional module(s) not depicted may be present and may support at least a portion of the described functionality and/or additional functionality. Moreover, while certain module(s) may be depicted and described as sub-module(s) of another module, in certain embodiments, such module(s) may be provided as independent module(s) or as sub-module(s) of other module(s).

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

That which is claimed is:

1. A method comprising:
receiving, by one or more computer processors coupled to memory, a first request from a user device for a first live content stream from a first three-dimensional camera that is positioned at a first location at a venue, wherein the first live content stream includes 360 degree video of the first location;
sending the first live content stream to the user device, wherein content presented at the user device corresponds to a physical positioning of the user device, and wherein movement of the user device causes different portions of the 360 degree video captured by the first three-dimensional camera to be presented at the user device;
determining, by the user device, a first physical position of the user device;
presenting, by the user device, a first portion of the 360 degree video captured by the first three-dimensional camera that corresponds to the first physical position;
receiving a second request from the user device for a second live content stream from a second three-dimensional camera that is positioned at a second location at the venue, wherein the second live content stream includes 360 degree video of the second location;
sending the second live content stream to the user device, wherein content presented at the user device corresponds to a physical positioning of the user device, and wherein movement of the user device causes different portions of the 360 degree video captured by the second three-dimensional camera to be presented at the user device;
determining, by the user device, a second physical position of the user device;
presenting, by the user device, a second portion of the 360 degree video captured by the second three-dimensional camera that corresponds to the second physical position;
determining, by the user device, a third portion of the 360 degree video captured by the first three-dimensional camera at a time the second request is sent by the user device;
determining a subject of the third portion;
determining, by the user device, a fourth portion of the 360 degree video captured by the second three-dimensional camera that corresponds to the third portion, wherein the subject is present in the fourth portion;
initially presenting, by the user device, the fourth portion of the 360 degree video captured by the second three-dimensional camera; and
associating a physical position of the user device in a three-dimensional ambient environment of the user device with the third portion and the fourth portion.

2. The method of claim 1, further comprising:
determining, by the user device, a third physical position of the user device at a time the second request is sent by the user device; and
initially presenting, by the user device, a third portion of the 360 degree video captured by the second three-dimensional camera that corresponds to the third physical position when the second live content stream is initially received by the user device.

3. The method of claim 1, further comprising:
causing presentation of an identifier associated with the user device at a display positioned at the venue while the user device is receiving the first live content stream or the second live content stream.

4. A method comprising:
determining, by one or more computer processors coupled to memory, a first content stream of 3D content to send to a user device, wherein movement of the user device causes presentation of different portions of the 3D content at the user device;
determining a first position of the user device;
causing presentation of a first portion of the first content stream at the user device, wherein the first portion corresponds to the first position;
determining a second content stream of 3D content, wherein movement of the user device causes presentation of different portions of the 3D content at the user device;
causing presentation of a second portion of the second content stream at the user device, wherein the second portion corresponds to the first position of the user device;
determining a subject of the first portion of the first content stream;
determining a third portion of the second content stream that includes the subject;
initially causing the user device to present the third portion when switching from the first content stream to the second content stream; and
associating the first position of the user device with the first portion of the first content stream and the third portion of the second content stream as an anchor point.

5. The method of claim 4, further comprising:
determining a second position of the user device; and
causing presentation of a third portion of the second content stream at the user device, wherein the third portion corresponds to the second position.

6. The method of claim 4, further comprising:
determining a second position of the user device during presentation of the second content stream;
determining a third portion of the first content stream corresponding to the second position; and
causing presentation of the third portion of the first content stream at the user device.

7. The method of claim 4, wherein a first orientation of the subject in the first portion of the first content stream relative to a first camera is different than a second orientation of the subject in the third portion of the second content stream relative to a second camera.

8. The method of claim 4, further comprising:
causing presentation of a graphical avatar at the user device during presentation of the first content stream or the second content stream.

9. The method of claim 4, wherein movement of the user device in a three-dimensional space during viewing of the first content stream is reflected in an initial viewing position of the second content stream.

10. The method of claim 4, further comprising:
causing presentation of an identifier associated with the user device at a display positioned at a physical location of the first content stream while the user device is receiving the first content stream or the second content stream.

11. The method of claim 4, wherein 3D content comprises 360 degree video, and wherein the user device is configured to be moved so as to present portions of the 360 degree video during movement of the user device.

12. The method of claim 4, wherein the first content stream is captured by a first three-dimensional camera at a first location of a venue, and the second content stream is captured by a second three-dimensional camera at a second location of the venue.

13. A system comprising:
a user device; and
a server comprising memory configured to store computer-executable instructions, and at least one computer processor configured to access the memory and execute the computer-executable instructions to:
determine a first content stream of 3D content to send to the user device, wherein movement of the user device causes presentation of different portions of the 3D content at the user device;
determine a first position of the user device;
cause presentation of a first portion of the first content stream at the user device, wherein the first portion corresponds to the first position;
determine a second content stream of 3D content, wherein movement of the user device causes presentation of different portions of the 3D content at the user device;
cause presentation of a second portion of the second content stream at the user device, wherein the second portion corresponds to the first position of the user device;
determine a subject of the first portion of the first content stream;
determine a third portion of the second content stream that includes the subject;
initially cause the user device to present the third portion when switching from the first content stream to the second content stream; and
associate the first position of the user device with the first portion of the first content stream and the third portion of the second content stream as an anchor point.

14. The system of claim 13, wherein the at least one processor is further configured to access the memory and execute the computer-executable instructions to:
determine a second position of the user device; and
cause presentation of a third portion of the second content stream at the user device, wherein the third portion corresponds to the second position.

15. The system of claim 13, wherein the at least one processor is further configured to access the memory and execute the computer-executable instructions to:
determine a second position of the user device during presentation of the second content stream;
determine a third portion of the first content stream corresponding to the second position; and
cause presentation of the third portion of the first content stream at the user device.

* * * * *